Sept. 5, 1933.  R. J. DOUGHERTY  1,926,000
THERMOSTATICALLY OPERATIVE VALVE
Filed March 31, 1932
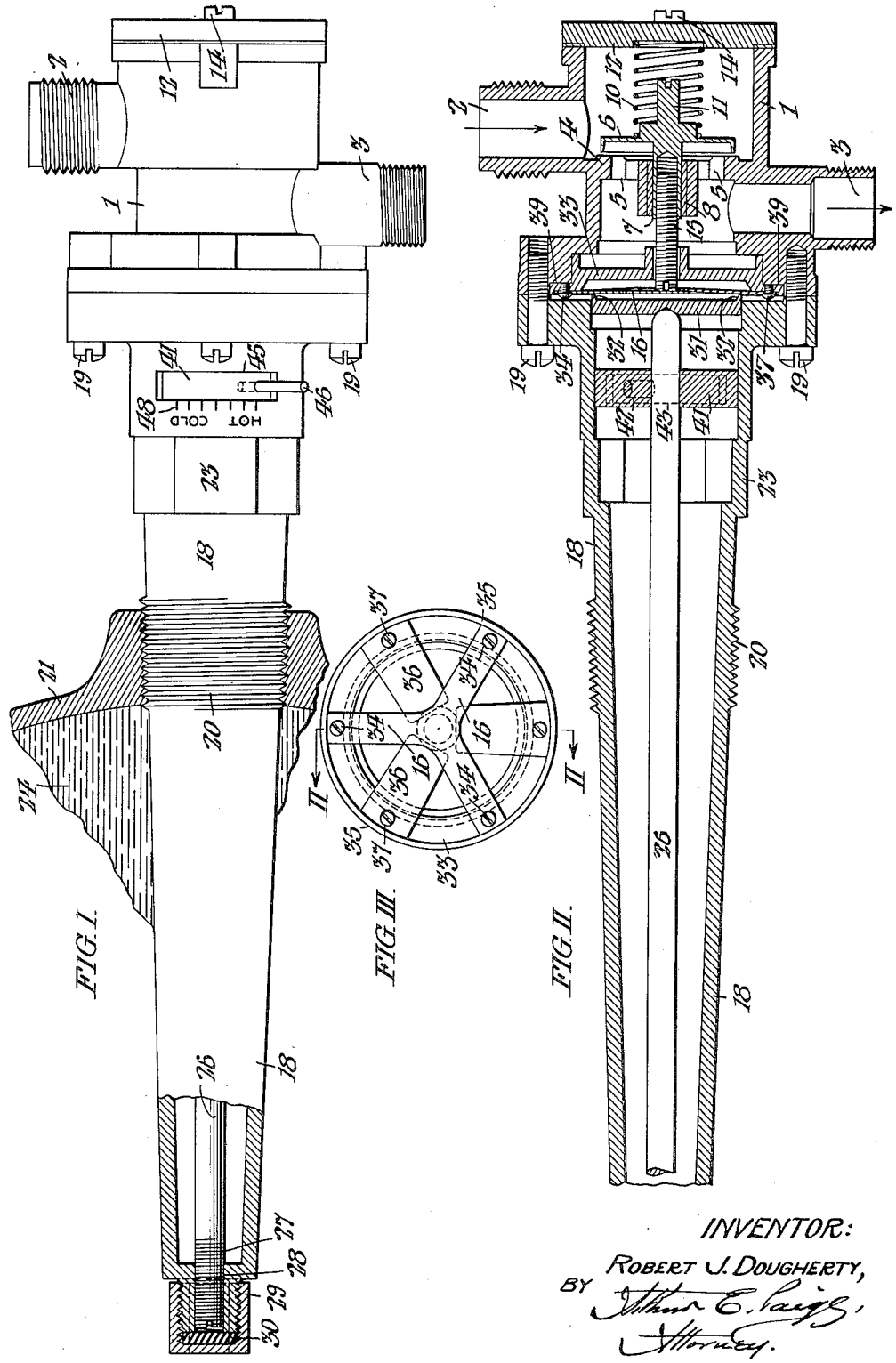
INVENTOR:
ROBERT J. DOUGHERTY,
BY Patented Sept. 5, 1933

1,926,000

UNITED STATES PATENT OFFICE 1,926,000

THERMOSTATICALLY OPERATIVE VALVE

Robert J. Dougherty, Ambler, Pa., assignor to John Wood Manufacturing Company, Conshohocken, Pa., a corporation of Pennsylvania Application March 31, 1932. Serial No. 602,235

6 Claims. (Cl. 236—48)

My invention is applicable to control the flow of gas to a burner which is part of a water heater, by location of the thermostatic element in the body of water which is being heated. That thermostatic couple comprises a tube of copper, or other metal having a high coefficient of expansion, and containing a rod of another material having a coefficient of expansion which is substantially zero throughout the range of temperatures to which the couple is subjected. My invention includes means, accessible from the exterior of the valve casing for adjustably varying the effective length of such inner member of said couple, and means interposed between said thermostatic couple and the valve, adapted to multiply the relative movement of said couple and effect snap action of the valve.

In the form of my invention hereinafter described; one member of the thermostatic couple is a cast metal casing which may be permanently rigidly connected with the wall of a water container and the other member of the thermostatic couple is adjustably screw threaded in engagement with said casing at the end of the latter projecting into the water container; so that the temperature at which snap action of the valve is effected may be varied by rotation of the inner member of the couple to shift its axial position with reference to the outer member of the couple. In that form; the valve mechanism is inclosed in a casing which is normally rigidly connected with said casing member of the couple, at the outer end thereof, but is readily detachable therefrom for repair and replacement of parts of the valve mechanism.

My invention includes the various novel features of construction and arrangement hereinafter more definitely specified.

In said drawing: Fig. I is a plan view of a thermostatic valve casing in engagement with a water container, a fragment of which is shown in section; the inner end of said casing being sectioned on the same plane to show the adjustable screw engagement of the inner thermostatic member with said casing.

Fig. II is a longitudinal sectional view of said casing and its appurtenances taken on the same plane as the inner end thereof in Fig. I.

Fig. III is an axial end elevation of the annular frame supporting the group of four springs by which snap action of the valve is effected, which frame is shown in section in Fig. II, taken on line II, II, in Fig. III.

In said figures; the valve casing 1 is conveniently formed of cast metal with the gas inlet 2 and outlet 3 upon opposite sides of the partition 4. Said partition 4 has valve ports 5 through it controlled by the valve 6 having the inner stem 7 mounted to reciprocate in the bearing 8 in said partition. Said valve is continually pressed toward its seat by the spring 10 which bears at its inner end upon said valve 6 encircling the outer valve stem 11. Said spring abuts at its outer end against the closure cap 12 which is detachably engaged with said casing 1 by two screws 14. Said valve stem 7 carries the screw 15 at its inner end in axial adjustment therewith and both said screw and the outer valve stem 11 are slotted to facilitate axial adjustment of said screw in cooperative relation with the tripod spring 16 by which said valve is snapped open in opposition to the pressure of said spring 10, as hereinafter described.

Said valve casing 1 is rigidly but detachably connected with the thermostatic casing 18, conveniently by the screws 19. Said casing 18 has the screw thread 20 conveniently of a tapered standard pipe size, for engagement thereof with the water container comprising the cylindrical shell 21. Engagement of said casing 18 with said shell 21 is conveniently effected by means of the hexagonal wrench hold 23 on said casing 18. The portion of said casing 18 projecting into the body of water 24 in said container 21 is preferably conical, as shown, not only to minimize the quantity of metal required to form it but to facilitate the circulation of water longitudinally with respect thereto as the result of upward flow of the water due to convection currents therein. The fact that said casing 18 converges toward the center of the container 21 induces the flow of water in that direction along the lower side of said casing 18.

Said casing 18 constitutes one member of the thermostatic couple of which the other member is the cylindrical rod 26 preferably formed of an alloy of ferric metal of such composition that it remains of substantially invariable length throughout the range of temperatures to which the couple is subjected. Said thermostatic rod 26 has the screw thread 27 at its inner end in engagement with the screw thread 28 in said casing 18 so that the relative axial position of said rod 26 may be adjustably varied by turning it. Leakage of water into the casing 18 from the container 21 is prevented by the screw cap 29 and rubber gasket 30 which are tightly fitted upon the end of said casing 18 before the latter is inserted in the container 21. The opposite end of said thermostatic rod 26 bears against the thrust disk 31 which has the annular knife edge 32 bearing against each of the three limbs of said tripod spring 16. Said spring 16 is made of concavo-convex form with its convex surface normally presented toward said thrust disk 31 and of such configuration as to normally permit the valve 6 to be seated upon said partition 4 by the spring 10 to prevent the passage of gas from said inlet 2 to said outlet 3. As shown in Fig. III, each of the three limbs of said tripod spring 16 is tightly held in the annular frame 33 by respective screws 34. Moreover, radial movement of each of the three limbs of said spring 16 is prevented by contact with the abutment flange 35 on said frame 33, as indicated in Fig. III. Said spring frame 33 also carries a circular series of three independent auxiliary springs 36 interposed between the limbs of said spring 16, as shown in Fig. III, and tightly held at their outer ends by respective screws 37 engaging said frame, and with the outer ends of said springs tightly fitted against said abutment flange 35 on said frame 33. Said springs 36 normally extend in a common plane in spaced relation with the spring 16, when the latter is in its normal inwardly arched position, but when said spring 16 is pressed outwardly, to the right in Fig. II, by contraction of the casing 18 as the water 24 cools in said container 21 below the temperature for which the thermostat is set; said spring 16 is reversed in its concavo-convex curvature to the position shown in Fig. II in which it is convexed outwardly, to the right, to thrust the valve 6 off its seat by contact with said adjusting screw 15 and, in that position, said spring 16 is reinforced by contact with the inner ends of each of said springs 36. Consequently, the arrangement described is such that movement of said spring 16 to open the valve 6 as shown in Fig. II to admit gas to the burner for heating the water 24, is effected solely by the snap action of said spring 16. However, reverse movement of said spring to restore it to its normal form, convexed to the left in Fig. II, is assisted by said three auxiliary springs 36. Such reverse movement is initiated by said springs 36 when pressure upon said spring 16 to the right in Fig. II is relaxed and relieved by expansion of the casing 18 under increment of temperature absorbed from the heated water.

The advantage of the employment of a plurality of springs 16 and 36 in the cooperative relation above described, is that what is termed in the art the "temperature differential", i. e., the difference between the respective temperatures at which said valve 6 is automatically opened and permitted to close, is very materially reduced as compared with devices of the prior art in which a disk spring is employed having freedom for movement at its perimeter; the temperature differential in embodiments of my invention being less than one-half that in the disk type of apparatus.

As shown in Fig. II; said spring frame 33 is conveniently fitted in the valve casing 1 in contact with the inner surface of the flange 39 of the latter. However, said frame might be omitted and the springs 16 and 36 directly connected with said casing 1; said frame 33 being employed merely for convenience of manufacture and assembly of the parts.

Said thermostatic rod 26 is axially adjusted in the described screw threaded connection with the thermostatic casing 18 so that the spring 16 is continually under stress which is nearly sufficient to cause it to snap to the right to open the valve 6, as shown in Fig. II; in order to minimize the relative movement of the members 18 and 26 of the thermostatic couple required to effect such snap action of said spring 16. The extent to which said valve is thus opened may be varied by axial adjustment of said screw 15. The precise temperature at which the snap action is effected may be varied, as above contemplated, by turning movement of said thermostatic rod 26, and such movement is conveniently effected by means of the collar 41 which is detachably but rigidly connected with said rod 26 by the set screw 42 extending through the sectoral slot 43 in the side of said casing 18 opposite to the sectoral slot 45 shown in Fig. I, through which the index pointer and handle 46, which is in screw threaded engagement with said collar 41, projects in cooperative relation with the arcuate series of graduations 48 on the outer surface of said casing 18, as shown in Fig. I.

As shown in Fig. I, said handle 46 is turned to the "Hot" side of said graduations 48 with the effect of opening said valve 6 and keeping it open until the water has reached the greatest degree of heat within the range of the apparatus shown; whereupon, the expansion of the casing 18 permits the restoration of the valve 6 to closed position, as above contemplated.

In other words; movement of said handle 46 to the position shown in Fig. I unscrews the thermostatic rod 26 to the right to the greatest extent limited by the arcuate exent of said slot 45. Movement of said handle 46, upwardly with reference to Fig. I, toward the opposite end of said slot 45, moves said rod 26 axiallly toward the left to shorten the effective length thereof and permit the valve 6 to shut when the water is cooler, in accordance with the position of said handle 46 with reference to said graduations. I find it convenient to make said range of adjustment from 140° to 170° F., with reference to the temperature of the water 24.

Initial calibration of the relative position of the thermostatic elements 18 and 26 is facilitated and the maintenance of the adjustment thereof insured by the fact that said rod is in direct screw threaded engagement with the casing 18. Interposition of a bushing or other separate element between the thermostatic elements, as in the prior art, affords opportunity for accidental variation in the relation of the thermostatic elements by displacement of the intermediate element, unless means are employed, at additional cost, for securing said intermediate element against such accidental displacement. However, I do not desire to limit myself to the precise details of construction and arrangement herein set forth, as it is obvious that various modifications may be made therein without departing from the the essential features of my invention, as defined in the appended claims.

I claim:

1. In a thermostatically operative valve structure; the combination with a reciprocatory valve; of a thermostatic couple operatively related to said valve, and comprising a tubular casing, and a rod in said thermostatic casing having one end thereof in direct screw threaded engagement with said casing; a snap spring between said valve and rod, including a narrow radially extending limb; said limb being initially bent away from said valve at the axis of the latter but capable of flexure in the opposite direction to open said valve; means fixedly securing the outer end of said limb in said valve casing; and a thrust member interposed between said thermostatic rod and said spring limb and bearing upon said limb near the radially outer end thereof; whereby contraction of said thermostatic casing thrusts said rod and spring limb toward said valve for opening the latter; an auxiliary spring fixed at its outer end in said casing and having its inner end in spaced relation with said spring limb when said valve is in closed position, but adapted to reinforce said spring limb when the latter has snapped to position to open said valve, for initiating return movement of said spring limb to its normal position in spaced relation with said auxiliary spring; and a spring normally stressing said valve toward its closed position.

2. In a thermostatically operative valve structure; the combination with a valve casing having a fluid inlet port and a fluid outlet port; of a valve mounted to reciprocate in said casing, for controlling the passage of fluid from said inlet port to said outlet port; a spring in said casing continually stressing said valve toward its closed position; a thermostatic couple adapted to cooperate to open said valve, and including a thermostatic casing detachably rigidly connected with said valve casing, and having an internal screw thread at its end remote from said valve casing, and a thermostatic rod in said thermostatic casing having one end in direct screw threaded engagement with said casing and the other end opposed to said valve; and a spring including a plurality of narrow radially extending limbs interposed between said valve and thermostatic couple; said limbs being initially bent away from said valve at the axis of the latter but capable of flexure in the opposite direction to open said valve; means fixedly securing the outer end of said limbs in said valve casing; and a thrust disk interposed between said thermostatic rod and said spring limbs and having a knife edge bearing upon said limbs near the radially outer ends thereof; including auxiliary springs, each fixed at its outer end in said casing and with its inner end extending between said other spring limbs, in spaced relation therewith when said valve is in closed position, but in reinforcing contact therewith when said valve is in open position; whereby, return movement of said limbs to their initial position is initiated by said auxiliary springs.

3. In a thermostatically operative valve structure; the combination with a valve casing having a fluid inlet port and a fluid outlet port; of a valve mounted to reciprocate in said casing, for controlling the passage of fluid from said inlet port to said outlet port; a spring in said casing continually stressing said valve toward its closed position; a thermostatic couple adapted to cooperate to open said valve, and including a thermostatic casing detachably rigidly connected with said valve casing, and having an internal screw thread at its end remote from said valve casing, and a thermostatic rod in said thermostatic casing having one end in direct screw threaded engagement with said casing and the other end opposed to said valve; and a spring including a plurality of narrow radially extending limbs interposed between said valve and thermostatic couple; said limbs being initially bent away from said valve at the axis of the latter but capable of flexure in the opposite direction to open said valve; means fixedly securing the outer ends of said limbs in said valve casing; and a thrust disk interposed between said thermostatic rod and said spring limbs and having a knife edge bearing upon said limbs near the radially outer ends thereof; including a ring removably mounted in said casing and carrying the outer ends of said spring limbs.

4. The combination with a snap spring including an axial portion with a plurality of narrow radial limbs; of means for holding the outer ends of said limbs respectively immovable; said spring being normally convexed from the plane of its ends in one direction but capable of snapping to opposite convexity when thrust beyond a critical point, including an auxiliary spring fixed at its outer end and extending radially with respect to the axis of said snap spring, in spaced relation with the latter in its initial position, for cooperation with said snap spring when the latter has snapped from its initial position; whereby said auxiliary spring is adapted for initiating the return of said snap spring to its initial position.

5. The combination with a snap spring including an axial portion with a plurality of narrow radial limbs; of means for holding the outer ends of said limbs respectively immovable; said spring being normally convexed from the plane of its ends in one direction but capable of snapping to opposite convexity when thrust beyond a critical point, including a ring carrying the outer ends of said snap spring.

6. The combination with a snap spring including an axial portion with a plurality of narrow radial limbs; of means for holding the outer ends of said limbs respectively immovable; said spring being normally convexed from the plane of its ends in one direction but capable of snapping to opposite convexity when thrust beyond a critical point, including an auxiliary spring fixed at its outer end and extending radially with respect to the axis of said snap spring, in spaced relation with the latter in its initial position, for cooperation with said snap spring when the latter has snapped from its initial position; whereby said auxiliary spring is adapted for initiating the return of said snap spring to its initial position; and including a single ring supporting the outer ends of said snap spring and auxiliary spring.

ROBERT J. DOUGHERTY.